United States Patent [19]

Isashi

[11] Patent Number: 4,827,826
[45] Date of Patent: May 9, 1989

[54] PIANO TOY TYPE MUSICAL INSTRUMENT

[75] Inventor: Hiroyuki Isashi, Shizuoka, Japan

[73] Assignee: Kawai Gakki Seisakusho Co., Ltd., Shizuoka, Japan

[21] Appl. No.: 105,031

[22] Filed: Oct. 6, 1987

[30] Foreign Application Priority Data

Oct. 7, 1986 [JP] Japan .................. 61-154646[U]

[51] Int. Cl.$^4$ .............................................. G10G 1/02
[52] U.S. Cl. ................................ 84/470 R; 84/477 R
[58] Field of Search ............ 84/402 R, 423 R, 470 R, 84/477 R, 478

[56] References Cited

U.S. PATENT DOCUMENTS

| | | | |
|---|---|---|---|
| 2,791,147 | 5/1957 | Meadows | 84/470 R |
| 3,420,135 | 1/1969 | Wolf | 84/478 |
| 3,577,824 | 5/1971 | Lavan | 84/478 |
| 4,203,344 | 5/1980 | Krosnick | 84/470 |
| 4,331,062 | 5/1982 | Rogers | 84/478 |
| 4,366,741 | 1/1983 | Titus | 84/478 |

FOREIGN PATENT DOCUMENTS

| | | |
|---|---|---|
| 3119658 | of 0000 | Japan . |
| 3520222 | of 0000 | Japan . |
| 1281170 | 7/1972 | United Kingdom . |

*Primary Examiner*—Lawrence R. Franklin
*Attorney, Agent, or Firm*—Holman & Stern

[57] ABSTRACT

A keyboard musical instrument is disclosed which comprises a plurality of keys connected to a sound generating mechanism arranged to play the notes of the musical scale, wherein (a) the instrument is housed in a casing having an upper surface on which a musical stave is depicted; (b) the keys are arranged to operate a display device which in conjunction with said stave provides a visual display indicative of a given note when the key corresponding to that note is played; and (c) the display device includes a plurality of rod carrying indicia which are movable independently from the keys and which generate the sound corresponding with the indicia scale by push-down motion therein also.

3 Claims, 4 Drawing Sheets

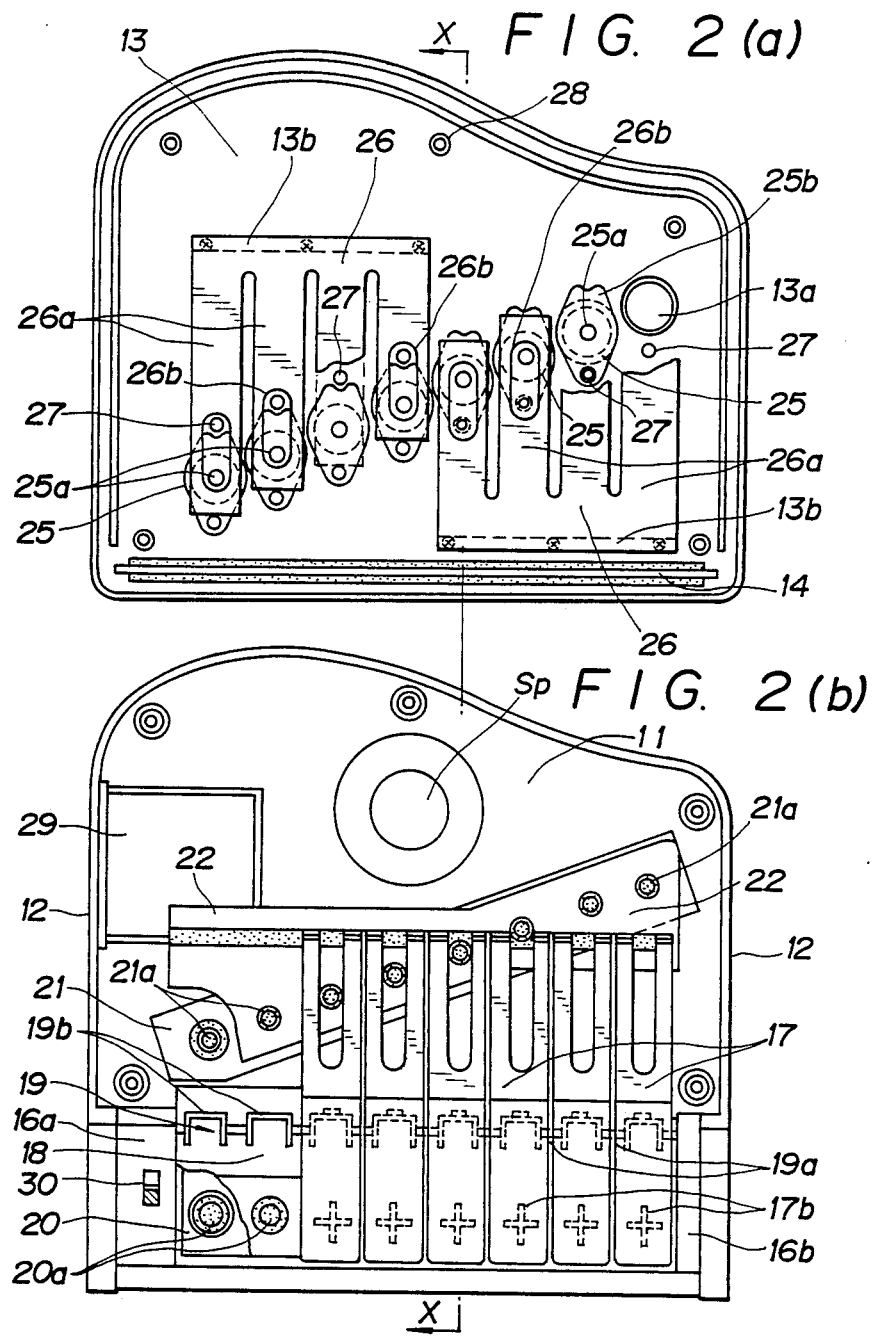

PIANO TOY TYPE MUSICAL INSTRUMENT

BACKGROUND OF THE INVENTION (a) Field of the Invention

This invention relates to an improved piano-type toy intended to help children to learn musical notes and scales and to practice keyboard exercises.

Existing toy musical instruments of this type only makes a sound when a key is touched, and do not show which note of the scale is being played, so these existing instruments are unable to help generate a cognitive connection between each key and the corresponding sound it produces.

This invention provides a piano-type instrument which provides a visual display indicative of or corresponding to the sound made.

An object of the invention is to provide a mechanism that can recognize the note of the musical scale corresponding with key touch motion and can also play the piano by push-down motion of an indicia rod.

(b) Description of the Prior Art

This invention relates to the improvement of the piano type toy instrument for children to learn the sound scales on. There are several instruments that teach the sound scales by showing the notes on a musical scale according to the piano keys played, e.g., U.S. Pat. No. 4,331,062 and No. 4,366,741.

But, they provide very intricate structures that are difficult to apply in the toy piano.

On the other hand, there are toy pianos show in Japan, U. M. Publication No. 31-19658 and No. 35-20222, but they do not show the sound scale corresponding to key motion, and only show a moving butterfly wing or eye light in accordance with key motion.

SUMMARY OF THE INVENTION

This musical instrument is comprised of a grand piano style case having a key board, a top plate depicting a musical stave in which indicia rods move up or down to correspond with key motion, and a sound generating circuit. And in this musical instrument, sound can be generated by push action of the indicia rods in addition to the usual key touch motion.

BRIEF DESCRIPTION OF THE DRAWINGS

FIG. 2(a) is a reverse side view of the top plate;

FIG. 2(b) is a plan view showing the inner case structure with the top plate removed;

DESCRIPTION OF PREFERRED EMBODIMENTS

Figure 6:
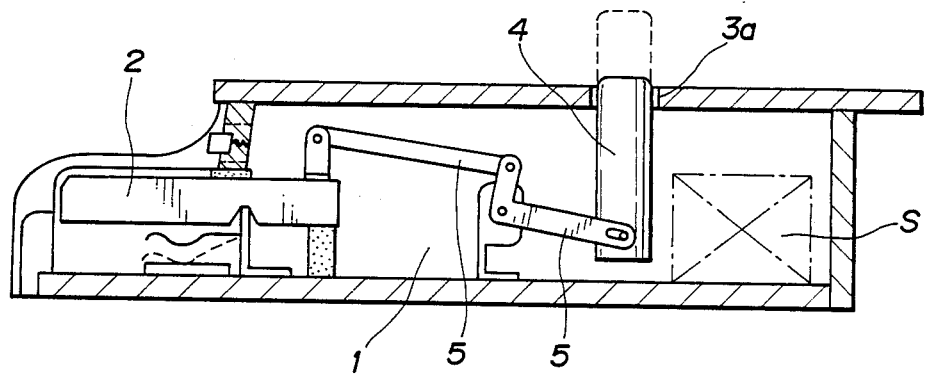
FIG. 6 is a cross-sectional side view of a basic piano type toy.

This invention relates to an improvement of a piano type toy shown in FIG. 6 and in Japan U.M. application No. 60-165803 and U.S. application Ser. No. 07/026,449.

In FIG. 6, inside the instrument case 1, a sound generating device S is installed, and touch keys 2 are pivotally engaged in front of the case. On the surface of the upper plate 3 of the case, the musical stave is printed.

In the stave, holes 3a are provided at the position of each note, and a rod is installed so as to be movable through each note. Rod 4 is connected to the key 1 by means of link arm 5.

When a key 1 is pushed down, the relevant rod 4 is pushed up through the hole 3a in the stave showing which note is sounded.

The most important point of this invention is that one can play the piano by the pushing motion of indicia rods 25 in addition to basic piano toy play action.

In FIGS. 1 to 4, case 10 has a shape approximating that of a grand piano and comprises a base plate 11, a side panel 12 having an inverted U shape, and a top plate 13. From the leading edge of the top plate 13, a cover plate 14 extends downwadly, and another cover plate 15 is provided in the frontmost part of the case.

Figure 3:
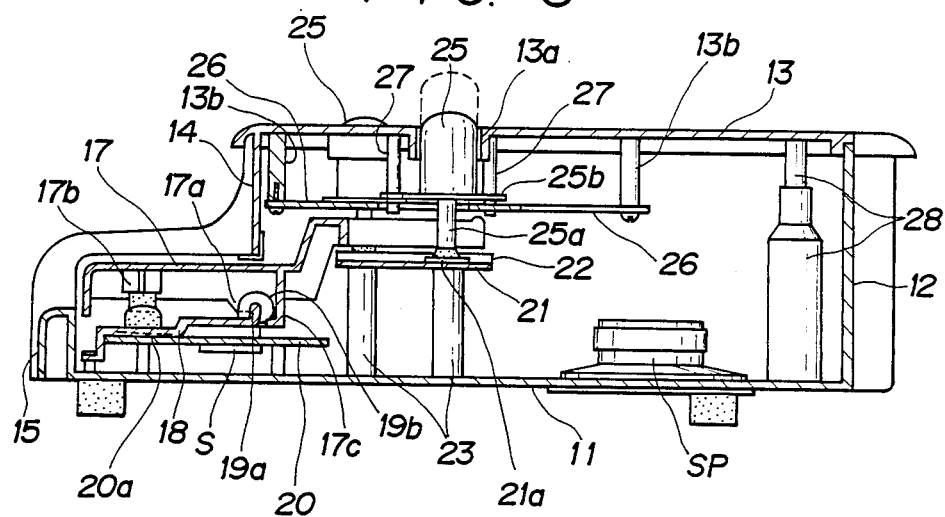
FIG. 3 is a cross-sectional side view along cutting plane line X—X of FIG. 2(a), (b)
Figure 4:
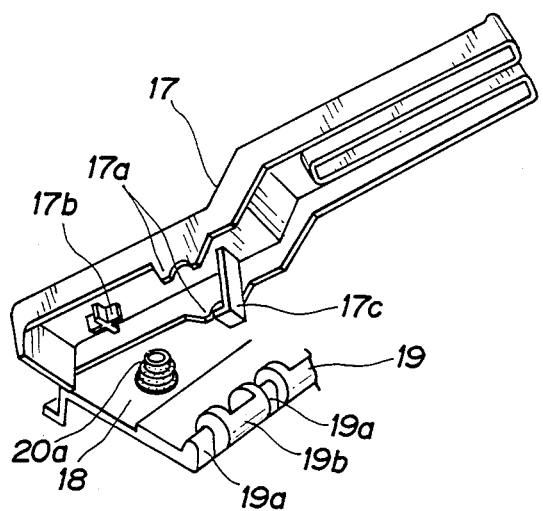
FIG. 4(a) is a partial perspective view of the key and rubber contact support.
FIG. 4(b) is a perspective view to show the supporting state of an indicia rod.
Figure 4:
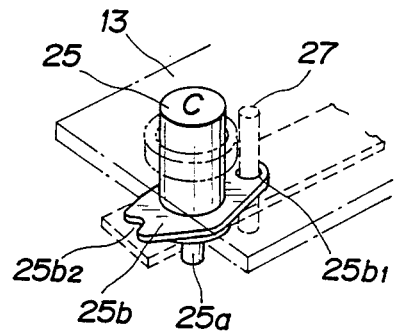

In the front of the case 10, keys 17 corresponding to one full octave are installed movably, and fixed blocks 16a, 16b are positioned on either side of the set of keys. Each key 17 has a fork shaped end part at its rear side that is positioned a little higher position than its front side, and a notch 17a on its underside as shown in FIGS. 3 and 4(a), with a supporting bar 19 being located within these notches and being fixed on base plate 11 to support all the keys. The keys 17 each have a downwardly extending projection 17b for operating an electric switch, and an L shaped guide piece 17c, and the rear end of the keys is supported on a rubber contact switch holder plate 22.

Under the front part of all keys 17, there is a first switch substrate 20 on which rubber switch contacts 20a are provided that are restrained in their circumference by a holder plate 18. The holder plate 18 is provided with a key supporting bar 19 which supports the key notches 17a by hinge points 19a and guide the L shaped guide pieces 17c by U shaped guide parts 19b to guide keys 17 so as to be rotatable but not get out of place in their usual condition. Both of the holder plate 18 and first switch substrate 20 are fixed on the base plate 11.

Under the rear part of each fork shaped key end, there is a second switch substrate 21 on which rubber switch contacts 21a are provided that are restrained in their circumference by the holder plate 22. The second switch substrate 21 is fixed on struts 23.

On each rubber switch contact 21, an indicia rod 25 is positioned so that it is possible to push the switch contacts 21a by means of the small rod 25a projecting from each of the indicia rods 25.

The rubber switch contacts 20a and 21a are connected to sound generating circuits S provided on first switch substrate 20 and operable to sound the speaker SP set on base plate 11. Main electric on-off switch 30 is located on left side block 16a.

Figure 1:
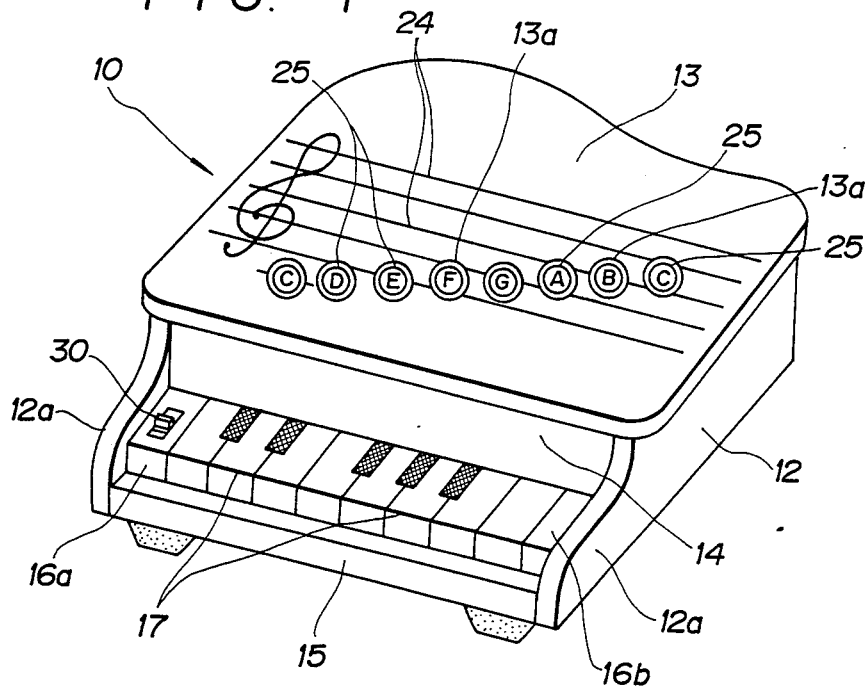
FIG. 1 shows a perpsective view of a piano type musical instrument.

On the top plate 13, the musical scale 24 is printed as shown in FIG. 1, and holes 13a are located in the positions corresponding to the notes of the scale on the stave.

In each hole 13a, a rod 25 is located which carries indicia, e.g. a different colour or the letter of the alphabet indicative of the note printed on its top or side surface. The rod is arranged so that its top surface stays at the same level and in a slightly projected condition from the top plate when not operated.

As shown in FIG. 3 and 4(b), each indicia rod 25 is composed of a large diameter rod at its upper part, a small diameter rod 25a at its lower part, and with a lozenge shaped flange 25b at its middle part. The flange 25b is provided with a small hole 25$b_1$ at one side and notch 25$b_2$ at the other side so as to prevent the rotation of said indicia rod by guiding the hole 25$b_1$ or notch 25$b_2$ with the pin 27 fixed on top plate 13 so that the indicia rod is held at its normal indicia showing position.

As shown in FIGS. 2 and 3, the support beams 13b are fixed on the top plate 13 near the cover plate 14 and at a distance therefrom in position to extend over each half width of the whole keys 17 (in the shown case, the overall keys' width is one octave width, and each rod support plate 26 has four support pieces 26a).

In the middle position between top plate 13 and keys 17, the comb-shaped two plates 26 of metal, hard paper or synthetic resin are arranged side by side in mutual reverse directions in the state that each is fixed on lower ends of the support beams 13b.

The rod support pieces 26a are provided with slots 26b that pass around the small diameter rods 25a under the indicia rods 25 and guide pins 27.

Each indicia rod 25 is supported on each rod support piece 26a by the lozenge shape flange 26b, and under the small diameter rod 25a, there is a rubber switch contact 21a held set on the second switch substrate 21 by the holder plate 22.

The fork end shaped rear part of each key 17 is positioned under the corresponding rod support piece 26a of support plate 26, and the small diameter rods 25a pass through between the fork end shaped parts.

The elements 28 are struts set between base plate 11 and top plate 13, and element 29 is a battery case.

In operation of this piano toy, after main electric switch 30 is closed, when the player pushes down a key 17, rubber switch contact 20a is pushed down by the downward extending projection 17b of the key and, so sound (for example the note G) corresponding to that key 17 is made by the sound generating circuit, and at the same time the rear part of the key 17 pushes up the rod support piece 26a of the support plate 26. The rod support piece 26a being pushed up is bent, so that the indicia rod 25 set on said rod support piece 26a is pushed out from top plate 13 as shown in dotted lines in FIG. 3.

As explained, the sound is made corresponding to the pushed key and at the same time, the indicia rod on the stave 24 shows the musical scale note name corresponding to the pushed key.

Thus, the child can recognize on the musical scale what sound is generated by the pushed down key.

On the other hand, when the key push action is released, the key 17 and indicia rod 25 are returned to their first position by their self weight and the flexibility of the rod support piece 26a, and generating of sound stops.

On the one hand, when the indicia rod 25 that is seen on top plate 13 is pushed down, the small diameter rod 25a under the indicia rod 25 pushes down the corresponding rubber switch contact 21a that is set on the second switch substrates 21 together with the rod support piece 26a, so that a sound that corresponds to the indicia rod note shown on the musical scale 24 is generated.

By the push down operation of each key 17 or each indicia rod 25, the child can learn the relation between melody and musical note with sensibility and visualization.

In this embodiment, the indicia rods 25 are shown to provide one octave and are supported by two support plates 26, but it is possible to use one support plate or three or four separate support plates.

Figure 5:
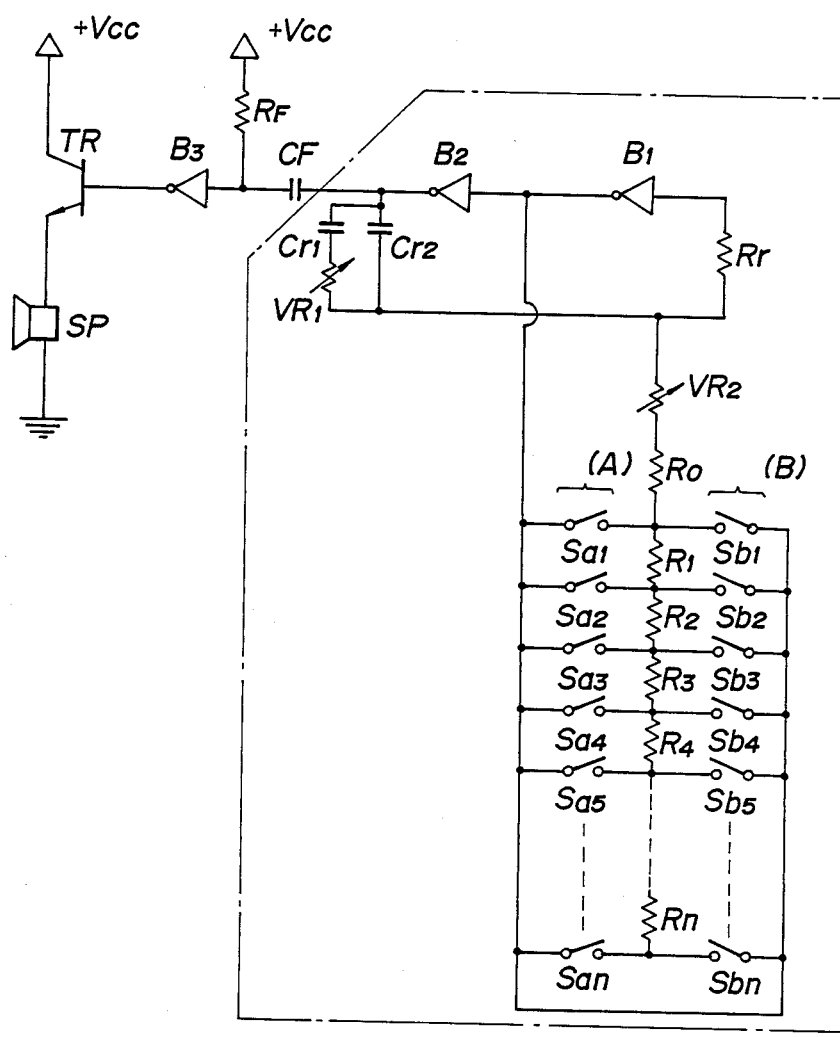
FIG. 5 is an exemplary circuit diagram of a sound generating unit.

FIG. 5 shows an example of a sound generating circuit diagram. This oscillating circuit is composed with inverters $B_1$ and $B_2$, resistors Rr $R_o$, $R_1$....Rn, variable resistors $VR_1$, $VR_2$, condensers $Cr_1$, $CR_2$, and key operation switches $Sa_1$, $Sa_2$....San, and indicia rod operation switches $Sb_1$, $Sb_2$, ...$5bn$. The sound generated by said oscillating circuit corresponding to each key or indicia rod is changed to the desirable tone by wave modulation via condenser CF, resistance RF, and inverter B, and is amplified by amplifier transistor TR, and finally, the speaker SP sounds. The designation Vcc in FIG. 5 shows battery voltage.

THE EFFECT OF THE INVENTION

In this piano toy type musical instrument, the children can play music by playing the piano keys and can recognize what note on the stave is played by seeing the projected indicia rod, and moreover, can play by pushing down on the indicia rods that appear on the top plate on which a musical scale is depicted.

So, the children can learn easily the relation between melody and musical note with sensibility and visualization by piano key playing or musical scale note rod pushing.

I claim:

1. A piano toy type musical instrument comprising a plurality of playable keys connected to a sound generating mechanism arranged to play notes to the musical scale,
   wherein the instrument is housed in a casing having an upper surface on which a musical stave is depicted, the keys are arranged to operate a display device which in conjunction with said depicted stave provides a visual display indicative of a given note when the key corresponding to that note is played, and the display device includes a plurality of rods each carrying scale note indicia thereon, which rods are each movable independently from the keys and which rods when pushed down cause the sound corresponding with the scale note indicia thereon to be generated.

2. A piano toy type musical instrument according to claim 1, wherein the sound generating mechanism comprises a sound generating circuit and rubber contact switches located under a front part of each key and under a bottom part of each indicia-carrying rod for actuating said sound generating circuit.

3. A piano toy type musical instrument according to claim 2, wherein said indicia-carrying rods are supported by a hinged flexible plate and can each move downwardly when pushed down to close the rubber contact switch under the bottom part thereof without motion of the keys.

* * * * *